United States Patent [19]

Shimura

[11] Patent Number: 4,816,681

[45] Date of Patent: Mar. 28, 1989

[54] METHOD AND APPARATUS FOR IMPROVING QUALITY OF ENERGY SUBTRACTION IMAGE

[75] Inventor: Kazuo Shimura, Kanagawa, Japan

[73] Assignee: Fuji Photo Film Co., Ltd., Kanagawa, Japan

[21] Appl. No.: 782,829

[22] Filed: Oct. 2, 1985

[30] Foreign Application Priority Data

Oct. 2, 1984 [JP] Japan ................................ 59-206516
Oct. 2, 1984 [JP] Japan ................................ 59-206517

[51] Int. Cl.$^4$ ........................... H04N 5/32; G03C 5/16
[52] U.S. Cl. ............................ 250/327.2; 364/413.23; 358/111; 378/99
[58] Field of Search .......................... 250/327.2, 484.1; 364/414; 358/111; 378/5, 99

[56] References Cited

U.S. PATENT DOCUMENTS

| 4,559,557 | 12/1985 | Keyes et al. | 364/414 |
| 4,564,861 | 1/1986 | Hishinuma et al. | 378/162 |
| 4,590,558 | 5/1986 | Glover et al. | 364/414 |

FOREIGN PATENT DOCUMENTS 0089665  9/1983  European Pat. Off. ......... 250/327.2

Primary Examiner—Janice A. Howell
Assistant Examiner—Richard E. Hanig
Attorney, Agent, or Firm—Sughrue, Mion, Zinn, Macpeak & Seas

[57] ABSTRACT

In energy subtraction processing, two or more stimulable phosphor sheets are used to record radiation images of an object which includes bone image and soft tissue image, and a difference signal for forming an image wherein the bone image or the soft tissue image is erased is obtained from the radiation images. The image quality of the energy subtraction image is improved by using the difference signal for picture elements at the portion where the bone image or the image of the soft tissue of a thickness of a predetermined value or larger is present, and by using the original image signal detected from the stimulable phosphor sheets for picture elements at the other portions.

9 Claims, 3 Drawing Sheets

F I G. 5A
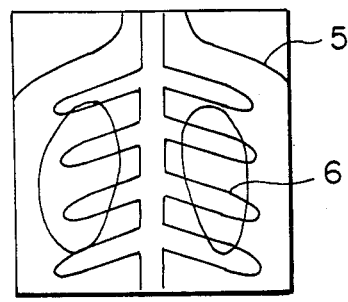
F I G. 5B
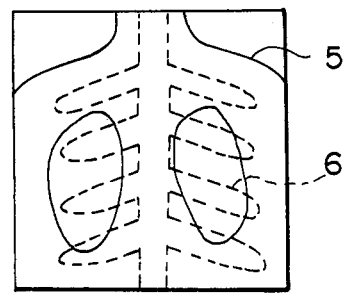
F I G. 5C
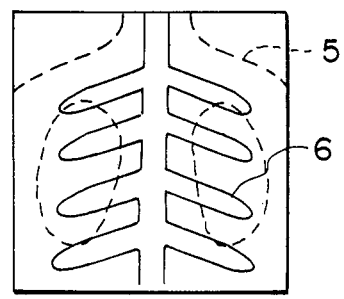

METHOD AND APPARATUS FOR IMPROVING QUALITY OF ENERGY SUBTRACTION IMAGE

BACKGROUND OF THE INVENTION

1. Field of the Invention

This invention relates to a method of improving the image quality of a subtraction image in subtraction processing of radiation images, and an apparatus for carrying out the method. This invention particularly relates to a method of improving the image quality of a subtraction image in digital subtraction processing of radiation images conducted by use of stimulable phosphor sheets, and an apparatus for carrying out the method.

2. Description of the Prior Art

Conventionally, a digital subtraction processing method is used for processig radiation images. In the method, two radiation images recorded under different conditions are photoelectrically read out to obtain digital image signals, which are then subjected to subtraction processing with respect to the corresponding picture elements of the images, to thereby obtain a difference signal for forming an image of a specific structure contained in the radiation images. The method makes it possible to reproduce a radiation image of only the specific structure by use of the signal thus obtained.

Basically, subtraction processing methods are classified into the temporal (time difference) subtraction processing type and the energy subtraction processig type. In the former method, the image of a specific structure is extracted by subtracting the image signal of a radiation image obtained without injection of contrast media from the image signal of a radiation image in which the image of the specific structure is enhanced by the injection of contrast media. In the latter method, an object is exposed to radiations of differing energy distributions to obtain two radiation images each containing the images of a specific structure recorded on the basis of the intrinsic radiation energy absorption characteristics of the specific structure. The image signals of the two radiation images are then weighted appropriately, when necessary, and subjected to subtraction to extract the image of the specific structure.

Since the subtraction processing is extremely effective for diagnostic purposes in image processing of medical X-ray photographs, it has recently attracted much attention, and research has continued to develop improved methods employing electronic technology. In particular, there is the processing technique called digital subtraction processing, or usually just digital radiography (abbreviated to "DR").

A novel digital subtraction processing method has been proposed, for example, in Japanese Unexamined Patent Publication No. 58 (1983)-163340. The method comprises the steps of (i) using two or more stimulable phosphor sheets exhibiting an extremely wide latitude of exposure to a radiation, (ii) exposing the stimulable phosphor sheets to radiation passig through the same object under different conditions to store radiation images of the object in the stimulable phosphor sheets, image information of a specific structure being different between the radiation images, (iii) detecting the radiation images by scanning with stimulating rays to obtain digital image signals, and (iv) conducting digital subtraction processing by use of the digital image signals. The stimulable phosphor sheets comprise a stimulable phosphor which is able to store a part of the radiation energy when exposed to a radiation such as X-rays, $\alpha$-rays, $\beta$-rays, $\gamma$-rays, cathode rays or ultraviolet rays, and then emits light in proportion to the stored energy of the radiation when exposed to stimulating rays such as visible light, as disclosed for example in U.S. Pat. No. 4,258,264. The stimulable phosphor sheets exhibit an extremely wide latitude of exposure and a markedly high resolving power. Therefore, when the digital subtracting processing is conducted by use of the radiation images stored in the stimulable phosphor sheets, it is possible to obtain a radiation image having an improved image quality, particularly a high diagnostic efficiency and accuracy, regardless of the amount of the radiation of which the stimulable phosphor sheets are exposed.

However, when radiation images of an object which include a bone image and a soft tissue image are recorded on two stimulable phosphor sheets and energy subtraction processing is conducted to obtain a subtraction image wherein the bone image or the soft tissue image is erased to extract only the soft tissue image or the bone image, since the extracted image signal of the soft tissue or bone is a difference signal generatedby the subtraction processing, the signal-to-noise ratio thereof is low, and the image quality of the subtraction image wherein the soft tissue image or the bone image is extracted is degraded.

SUMMARY OF THE INVENTION

The primary object of the present invention is to provide a method of sufficiently improving the image quality of an energy subtraction image wherein a soft tissue image or a bone image is extracted.

Another object of the present invention is to provide an apparatus for carrying out the method.

The present invention provides a method of improving image quality of an energy subtraction image obtained by energy subtraction processing in which two or more stimulable phosphor sheets are used to record radiation images of an object which include a bone image and a soft tissue image and a difference signal for forming an image wherein the bone image is erased is obtained from the radiation images, wherein the improvement comprises the step of: reproducing a visible radiation image by using said difference signal for picture elements at the portion where said bone image is present, and by using the original image signal detected from said stimulable phosphor sheets for picture elements at the other portions.

The present invention also provides a method of improving the image quality of an energy subtraction image obtained by energy subtraction processing in which two or more stimulable phosphor sheets are used to record radiation images of an object which include a bone image and a soft tissue image and difference signal for forming an image wherein the soft tissue image is erased is obtained from the radiation images, wherein the improvement comprises the steps of: reproducing a visible radiation image by using said difference signal for picture elements at the portion where said image of the soft tissue of a thickness of a predetermined value or larger is present, and by using the original image signal detected from said stimulable phosphor sheets for picture elements at the other portions (i.e. the portions where the soft tissue of a thickness smaller than the predetermined value is present and the portions where the object image is not present).

As the original image signal, it is possible to use the digital image signal detected from one of the stimulable phosphor sheets, or a signal obtained by arithmetic averaging of the digital image signals detected from a plurality of the stimulable phosphor sheets.

The method of the present invention wherein the bone image is erased is carried out by an apparatus comprising:

(i) an image read-out means for scanning a stimulable phosphor sheet carrying a radiation image stored therein by stimulating rays which cause the stimulable phosphor sheet to emit light in proportion to the stored radiation energy, and photoelectrically detecting and converting the emitted light into a digital image signal, (ii) a subtraction operation means for obtaining a difference signal for forming an image wherein a bone image is erased and a difference signal for forming an image wherein a soft tissue image is erased by conducting subtraction processing of digital image signals between the corresponding picture elements of radiation images, said digital image signals being detected by said image read-out means from two or more stimulable phosphor sheets carrying said radiation images stored therein by exposure to radiations having different levels of energy passing through the same object including the bone and the soft tissue, at least a part of the image information on said object being different between said radiation images, (iii) a discrimination means for discriminating the portion where said bone image is present on the basis of said difference signal for forming the image wherein the soft tissue image is erased, and generating a position signal representing the position of said portion, and (iv) a signal selection means for receiving the original image signal detected from said stimulable phosphor sheets, said difference signal for forming the image wherein the bone image is erased, and said position signal generated by said discrimination means, emitting said difference signal for forming the image wherein the bone image is erased as the image signal at the portion wherein the bone image and the soft tissue image overlap each other by referring to said position signal, and emitting said original image signal as the image signal at the other portions.

The method of the present invention wherein the soft tissue image is erased is carried out by an apparatus comprising:

(i) an image read-out means for scanning a stimulable phosphor sheet carrying a radiation image stored therein by stimulating rays which cause the stimulable phosphor sheet to emit light in proportion to the stored radiation energy, and photoelectrically detecting and converting the emitted light into a digital image signal, (ii) a subtraction operation means for obtaining a difference signal for forming an image wherein a bone image is erased and a difference signal for forming an image wherein a soft tissue image is erased by conducting subtraction processing digital image signals between the corresponding picture elements of radiation images, said digital image signals being detected by said image read-out means from two or more stimulable phosphor sheets carrying said radiation images stored therein by exposure to radiations having different levels of energy passing through the same object including the bone and the soft tissue, at least a part of the image information on said object being different between said radiation images, (iii) a discrimination means for discriminating the portion where said image of the soft tissue having thickness of a predetermined value or larger is present on the basis of said difference signal for forming the image wherein the bone image is erased, and generating a position signal representing the position of said portion, and (iv) a signal selection means for receiving the original image signal detected from said stimulable phosphor sheets, said difference signal for forming the image wherein the soft tissue image is erased, and said position signal generated by said discrimination means, emitting said difference signal for forming the image wherein the soft tissue image is erased as the image signal at the portion where the image of the soft tissue of a thickness of the predetermined value or larger is present by referring to said position signal, and sending out said original image signal as the image signal at the other portions.

In the present invention, since one radiation image is formed by use of the difference signal obtained by the subtraction processing and the original image signal, at least one of these signals should preferably be corrected for density (or luminance if the image is to be displayed on a CRT, or the like) and/or contrast in accordance with the density range and/or the contrast range of the other of these signals so that the portion where the bone image or the soft tissue of a thickness of the predetermined value or larger is present is combined smoothly with the other portions.

With the present invention, it is possible to ensure improvement of the image quality, particularly the diagnostic efficiency and accuracy, of the subtraction image in which the bone image or the soft tissue image is erased by the energy subtraction processing.

BRIEF DESCRIPTION OF THE DRAWINGS

FIGS. 5A, 5B and 5C are explanatory views showing the energy subtraction processing.

DESCRIPTION OF THE PREFERRED EMBODIMENTS

The present invention will hereinbelow be described in further detail with reference to the accompanying drawings.

Figure 1:
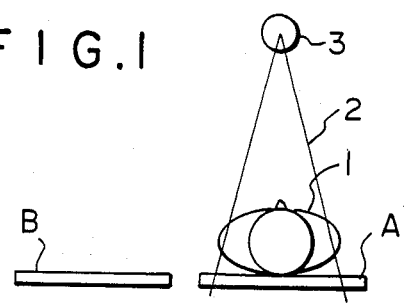
FIG. 1 is an explanatory view showing the radiation image recording step in the method of improving the image quality of a subtraction image in subtraction processing of radiation images in accordance with the present invention.

FIG. 1 shows the step of exposing stimulable phosphor sheets A and B respectively to X-rays 2 of different levels of X-ray energy passig through the same object 1 having bone and soft tissue such as a lung or the blood vessel. First, the stimulable phosphor sheet A is exposed to X-rays passing through the object 1 to store an X-ray image of the object 1 therein. The stimulable phosphor sheet A is then quickly removed from the image recording position, and the stimulable phosphor sheet B is quickly moved to the image recording position. At the same time, the tube voltage of an X-ray source 3 is changed, and an X-ray image of the object 1 is stored in the stimulable phosphor sheet B by the X-rays 2 having a different energy level. At this time, the relationship between the positions of the stimulable phosphor sheet A and the object 1 and the relationship between the stimulable phosphor sheet B and the object 1 are maintained the same.

Figure 2:
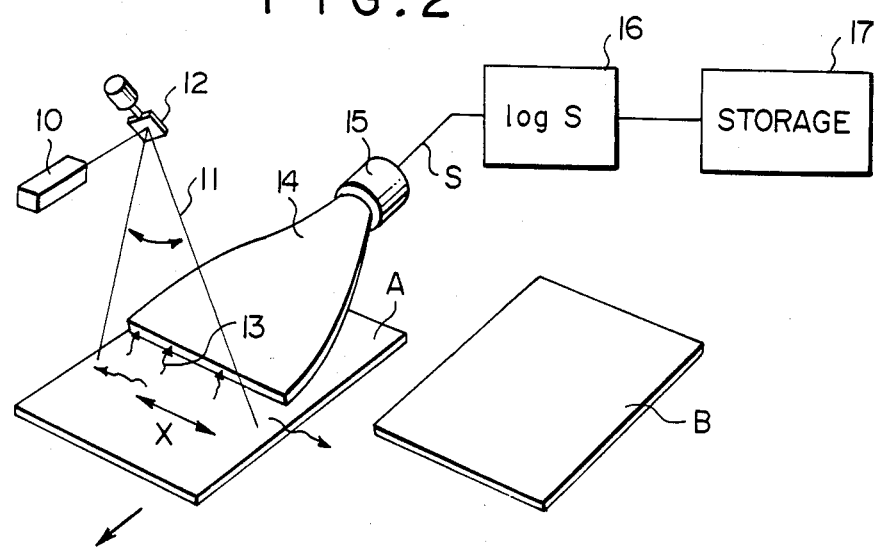
FIG. 2 is a schematic view showing the step of reading out the radiation images from the stimulable phosphor sheets carrying the radiation images stored therein as shown in FIG. 1.

As described above, two radiation images differing from each other in at least a part of their image information are stored in the stimulable phosphor sheets A and B. From the stimulable phosphor sheets A and B carrying the X-ray images stored therein, the X-ray images are read out by use of the image read-out means as shown in FIG. 2 to obtain digital image signals representing the X-ray images. First, while the stimulable phosphor sheet A is moved in the direction indicated by the arrow Y to conduct sub-scanning, a laser beam 11 emitted by a laser beam source 10 is deflected in the direction indicated by the arrow X by a scanning mirror 12 to conduct main scanning. In this manner, the stimulable phosphor sheet A is caused to release the X-ray energy stored therein as light 13 in proportion to the X-ray energy. The emitted light 13 enters a light guide member 14, which is made by forming a transparent acrylic sheet, from one end face thereof. The light guide member 14 may be of a shape and a material as disclosed in U.S. Pat. No. 4,346,295. The light 13 is then guided through total reflection inside of the light guide member 14 up to a photomultiplier 15, and the amount of the light 13 is output as an image signal S by the photomultiplier 15. The image signal S is then converted into a digital image signal logSA of a logarithmic value (logS) by a log-converter 16 comprising an amplifier and an A/D converter. The digital image signal logSA is stored in a storage medium 17 such as a magnetic tape. Thereafter, the X-ray image stored in the other stimulable phosphor sheet B is read out therefrom in exactly the same manner as described above, and the digital image signal logSB thus obtained in stored in the storage medium 17.

Figure 4:
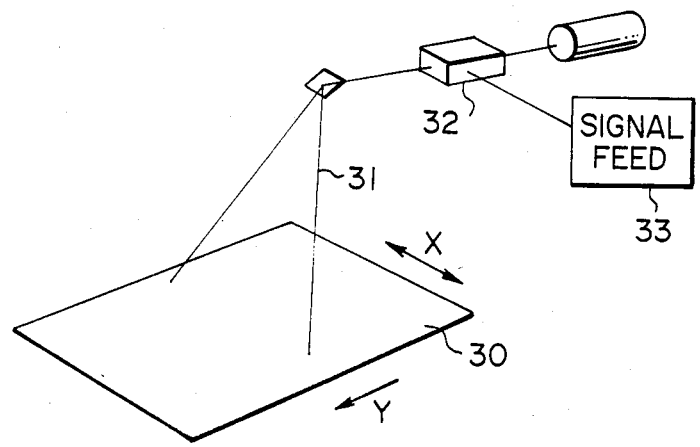
FIG. 4 is a schematic view showing an example of the subtraction image reproducing system.
Figure 3:
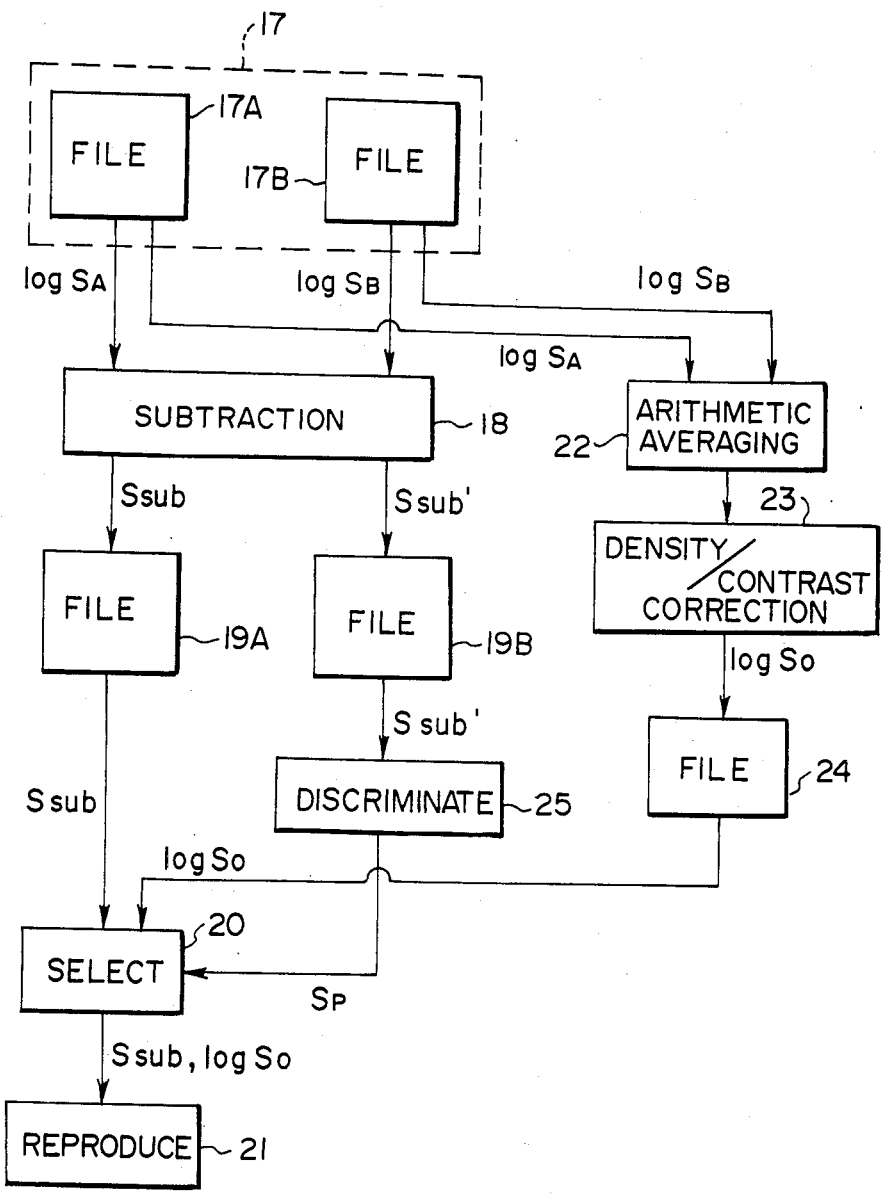
FIG. 3 is a block diagram showing energy subtraction processing wherein an embodiment of the method of improving the image quality of a subtraction image in accordance with the present invention is employed.

Thereafter, subtraction processing is conducted by use of the digital image signals logSA and logSB obtained as described above. FIG. 3 shows the flow of the subtraction processing wherein an embodiment of the method of improving the image quality of a subtraction image in accordance with the present invention is employed. First the digital image signals logSA and logSB are read respectively from image files 17A and 17B in the storage medium 17, and are sent to a subtraction operation circuit 18. The subtraction operation circuit 18 weights the digital image signals logSA and logSB appropriately and conducts a subtraction processing between the digital image signals logSA and logSB with respect to the corresponding picture elements to obtain a digital image signal Ssub as expressed by:

$$Ssub = a \cdot logSA - b \cdot logSB + c$$

where a and b denote weight factors, and c denotes a bias component for adjusting the density approximately to a predetermined value. The difference signal Ssub thus obtained is stored in an image file 19A and is then sent to an image reproducing apparatus 21, for example, a display device such as a cathode ray tube (CRT) or a point-by-point scanning apparatus which reproduces a subtraction image by use of the difference signal Ssub. FIG. 4 shows an apparatus for reproducing the image by point-to-point scanning as an example of the subtraction image reproducing system. A photosensitive film 30 is moved in the sub-scanning direction as indicated by the arrow Y, and at the same time a laser beam 31 is deflected onto the photosensitive film 30 in the main scanning direction as indicated by the arrow X. The laser beam 31 is modulated by an A/O modulator 32 with an image signal sent from an image signal feeder 33, to thereby form a visual image on the photosensitive film 30. By using the difference signal Ssub as the modulating image signal, it is possible to reproduce a visible image wherein only the specific structure is extracted by the digital subtraction processing on the photosensitive film 30.

In the case where the X-ray image of the object 1 stored in the image file 17A or the image file 17B contains a soft tissue image 5 and a bone image 6 as shown in FIG. 5A, the image formed by use of the difference signal Ssub becomes as shown in FIG. 5B wherein the bone image 6 is erased and only the soft tissue image 5 is extracted by appropriately selecting the weight factors a and b. The difference signal Ssub is stored in the image file 19A.

Then, the subtraction operation circuit 18 conducts the calculation as expressed by $$Ssub' = a' \cdot logSA - b' \cdot logSB + c'$$

where $a'$ and $b'$ denote weight factors, and $c'$ denotes a bias component for adjusting the density approximately to a predetermined value. When the factors $a'$, $b'$ and $c'$ are selected appropriately and the difference signal Ssub' thus obtained is used for image reproduction by the image reproducing apparatus 21, the image becomes as shown in FIG. 5C wherein the soft tissue image 5 is erased and only the bone image 6 is extracted. The difference signal Ssub' is stored in an image file 19B without being sent to the image reproducing apparatus 21.

As described above, when the calculation is conducted as expressed by $$Ssub = a \cdot logSA - b \cdot logSB + c$$

and an X-ray image is reproduced by use of the difference signal Ssub thus obtained, an image suitable for viewing, particularly for diagnostic purposes, wherein the bone image 6 is erased and only the soft tissue image 5 is extracted, is obtained. The image quality of the soft tissue image 5 in the subtraction image wherein the bone image is extracted becomes lower than the image quality of the soft tissue image in the image formed by use of the original signal, i.e. the digital image signal logSA or logSB. This is because the image signal, i.e. the difference signal Ssub, for forming the subtraction image wherein the bone image is erased is the one obtained by the aforesaid subtraction processing of the digital image signals logSA and logSB, and the signal-to-noise ratio of the difference signal Ssub is naturally lower than that of the digital image signal logSA or logSB.

Accordingly, as shown in FIG. 3, the digital image signals logSA and logSB are sent to an arithmetic averaging circuit 22 in which they are weighted appropriately and subjected to arithmetic averaging. Then, the signal obtained by the arithmetic averaging is corrected for the density and/or the contrast in a contrast correction circuit 23, and is stored in an image file 24. The signal obtained by the arithmetic averaging represents the original image and is sent to a signal selection circuit 20 as an original image signal logSo. The signal selection circuit 20 also receives a position signal Sp which represents the position of the bone image 6 and which is generated by a discrimination circuit 25 for discriminating the position at which the bone image 6 is present in the X-ray image, on the basis of the difference signal Ssub' which represents the image wherein only the bone image is extracted and which is stored in the image file 19B. The discrimination circuit 25 is constituted, for example, to compare the difference signals Ssub' at all picture elements with a predetermined threshold value and to discriminate a picture element exhibiting a difference signal Ssub' exceeding the threshold value as the picture element at the portion of the bone image 6. Upon receiving the position signal Sp, the signal selection circuit 20 selects and sends out the difference signal Ssub for the picture elements at the portion where the bone image 6 is present, and the original image signal logSo of the image file 24 for the picture elements at the other portions.

When the difference signal Ssub or the original image signal logSo thus selected in accordance with the picture element is used for image reproduction at the image reproducing apparatus 21, the image wherein the bone image is erased as shown in FIG. 5B is obtained. Thus, since the difference signal Ssub is used as the image signal of the picture element at the portion where the bone image 6 is present and the original image signal logSo prior to the subtraction processing is used as the image signal of the picture element at the other portions, the bone image 6 is erased and only the soft tissue image 5 is extracted in the reproduced X-ray image. Since the signal-to-noise ratio of the original image signal logSo is naturally higher than that of the difference signal Ssub obtained by the calculation between the original digital image signals logSA and logSB, the image quality of the reproduced X-ray image as a whole is higher than the image quality of the X-ray image reproduced by use of the difference signal Ssub at all picture elements. Namely, in the reproduced X-ray image, the portion at which the image quality is deteriorated by the subtraction processing is limited only to the portion where the bone image is present.

As mentioned above, the original image signal logSo is subjected to correction for density and/or contrast at the density and/or contrast correction circuit 23. The correction is conducted so that the portion at which the bone image 6 is present and which is reproduced by use of the difference signal Ssub and the other portions which are reproduced by use of the original image signal logSo are combined smoothly with regard to the image density and/or the contrast in a single X-ray image. The correction of the density and/or the contrast may be conducted manually on the basis of experience or may be conducted manually by displaying the image formed by the difference signal Ssub and the original image signal logSo on a CRT. Or, the difference signal Ssub at the picture element of a predetermined reference point of the soft tissue may be sent to the density and/or contrast correction circuit 23, and the original image signal logSo may be corrected automatically so that the difference signal Ssub and the original image signal logSo at the picture element of the reference point become equal to each other. Further, the correction of the density and/or the contrast may be conducted on the difference signal Ssub, instead of the original image signal logSo, or may be conducted on the original image signal logSo and the difference signal Ssub. Though the correction of the density and/or the contrast need not necessarily be conducted, such correction is preferable for obtaining a reproduced image in which the two portions formed by the original image signal logSo and the difference signal Ssub are combined smoothly.

Also, the discrimination circuit 25 may be constructed so that the operator manually inputs the information on the position of the bone image 6 by monitoring the image formed and displayed by the difference signal Ssub' on a CRT or the like.

In another embodiment of the present invention, a subtraction image wherein the soft tissue image 5 is erased and only the bone image 6 is extracted as shown in FIG. 5C is obtained by use of the difference signal Ssub calculated as described above by adjusting the weight factors a and b to appropriate values. In this embodiment, the factors a', b' and c' in the above-mentioned calculation formula for the difference signal Ssub' are selected so that the image obtained by use of the difference signal Ssub' is as shown in FIG. 5B wherein the bone image 6 is erased and only the soft tissue image 5 is extracted. In the same manner as in the embodiment mentioned first, the difference signals Ssub and Ssub' are respectively stored in the image files 19A and 19B shown in FIG. 3.

In this embodiment, in the same manner as described with reference to FIG. 3, the digital image signals logSA and logSB are sent from the image files 17A and 17B to the arithmetic averaging circuit 22 in which they are weighted appropriately and subjected to arithmetic averaging. Then, the signal obtained by the arithmetic averaging is corrected for density and/or contrast in the contrast correction circuit 23, and is stored in the image file 24. The signal obtained by the arithmetic averaging represents the original image and is sent to the signal selection circuit 20 as the original image signal logSo. The signal selection circuit 20 also receives a position signal Sp generated by the discrimination circuit 25 which receives the difference signal Ssub' representing the image wherein only the soft tissue image 5 is extracted and stored in the image file 19B. The discrimination circuit 25 discriminates the portion where the image 5 of the soft tissue of a thickness of a predetermined value or larger is present in the X-ray image. Specifically, the discrimination circuit 25 compares the difference signal Ssub' with a predetermined threshold value and discriminates a picture element exhibiting a difference signal Ssub' exceeding the threshold value as the picture element at the portion where the thickness of the soft tissue is equal to or larger than the predetermined value. In this manner, the position at which the image 5 of the soft tissue of a thickness of a predetermined value or larger is present is discriminated, and the position signal Sp representing the discriminated position is sent to the signal selecting circuit 20.

Upon receiving the position signal Sp, the signal selection circuit 20 selects and sends out the difference signal Ssub of the image file 24 for the picture elements at the portion designated by the position signal Sp, and the original image signal logSo of the image file 19A for the picture elements at the other portions, i.e. the portion where the soft tissue of a thickness smaller than the predetermined value and the portion where the object is not present.

In the X-ray image reproduced by the image reproducing apparatus 21 by use of the difference signal Ssub and the original image signal logSo thus selected in accordance with the picture elements, only the bone image 6 is extracted since the portion where the image 5 of the soft tissue of a thickness of the predetermined value or larger (e.g. the mediastinum) is present is formed by use of the difference signal Ssub. On the other hand, the image of the portion where the bone image 6 and the image 6 of the soft tissue of a thickness smaller than the predetermined value (e.g. the lung) overlap each other is formed by use of the original image signal logSo. Since the soft tissue is thin and exhibits little radiation absorption, the bone image 6 appears sharply even though the original image signal logSo is used. Since the image of the portions outside of the portion where the soft tissue of a thickness of the predetermined value or larger is present and which includes the portion where the bone image 6 and the image 5 of the soft tissue of a thickness smaller than the predetermined value overlap each other is formed by use of the original image signal logSo naturally exhibiting a signal-to-noise ratio higher than that of the difference signal Ssub obtained by the calculation between the original digital image signals logSA and logSB, the image quality of the reproduced X-ray image as a whole is higher than the image quality of the X-ray image reproduced by use of the difference signal Ssub at all picture elements. Namely, in the reproduced X-ray image, the portion at which the image quality is degraded by the subtraction processing is limited only to the portion where the image 5 of soft tissue of a thickness of the predetermined value or larger is present.

In the discrimination circuit 25, the threshold value for discriminating the portion where the image 5 of the soft tissue of a thickness of the predetermined value or larger is present may be fixed or may be adjustable by the operator by monitoring the image formed on a CRT or the like by use of the original image signal logSo. Thus the predetermined thickness of the soft tissue at the image 5 may be fixed in advance or may be changed in accordance with the radiation image.

Also, the discrimination circuit 25 may be constructed so that the operator manually inputs the information on the portion where the image 5 of the soft tissue of a thickness of the predetermined value or larger is present by monitoring the image formed and displayed by the difference signal Ssub on a CRT or the like.

In the aforesaid embodiments, the signal obtained by the arithmetic averaging of the digital image signals logSA and logSB detected from two stimulable phosphor sheets is used as the original image signal logSo. However, it is also possible to use either one of the digital image signals logSA and logSB as the original image signal logSo.

The present invention is also applicable to the case where three or more stimulable phosphor sheets are exposed to radiation of different energy levels. For example, when three stimulable phosphor sheets are used, the difference signal logSo may be calculated by $$logSo = a \cdot logSA + b \cdot logSB - c \cdot logSC + d$$

where a, b and c denote weight factors, and d denotes a bias component for adjusting the density of the difference signal logSo approximately to a predetermined value.

Further, in the aforesaid embodiments, stimulable phosphor sheets A and B are separately exposed to radiation of different energy levels. However, the method of recording a radiation image on a plurality of the stimulable phosphor sheets is not limited to the aforesaid method. For example, as disclosed in Japanese Unexamined Patent Publication No. 59(1984)-83486, a stack of the stimulable phosphor sheets or a stimulable phosphor sheet-filter stack may be exposed to a radiation by a single operation. Thus, any image recording method may be used insofar as a plurality of the stimulable phosphor sheets are exposed to radiation of different energy levels passing through the same object.

The energy subtraction processing conducted by using the stimulable phosphor sheets is also applicable to the case where an image wherefrom the image of a medical implement is erased is obtained from a radiation image of a human body in which is embedded the medical implement and to the case where an image wherefrom an image of contrast media is erased is obtained from a radiation image of a human body injected with contrast media. Accordingly, the term "bone" as used herein also embraces a metal, a contrast media or the like which may be regarded as an element equivalent to bone, and the term "soft tissue" embraces all things that exhibit radiation absorption characteristics different from those of the bone and that may be extracted in the radiation image by the energy subtraction processing.

I claim:

1. A method of improving image quality of an energy subtraction image obtained by energy subtraction processing which includes the steps of exposing two or more stimulable phosphor sheets to radiations having different levels of energy passing through the same object which includes bone and soft tissue to have radiation images of said object stored in said stimulable phosphor sheets, at least a part of image information being different between said radiation images, scanning the respective stimulable phosphor sheets by stimulating rays to sequentially release the radiation energy stored in said stimulable phosphor sheets as light emission, photoelectrically detecting and converting the amounts of the emitted light into digital image signals which are each indicative of an image of said bone and said soft tissue, and obtaining a first difference signal for forming an image wherein the image of said bone is erased by carrying out a subtraction processing of said digital image signals between corresponding picture elements of said radiation images, wherein the improvement comprises the steps of: obtaining a second difference signal for forming an image wherein the image of said tissue is erased by carrying out a subtraction processing of said digital image signals between corresponding picture elements of said radiation images, selecting picture elements where said bone image would be present in said first difference signal using said second difference signal, and reproducing a visible radiation image by using said selected picture elements in said first difference signal for picture elements at the portion where said bone image is present, and by using an original image signal, which corresponds to at least one of said digital image signals as they existed prior to subtraction processing and is indicative of the image of said bone and said soft tissue, for picture elements at the other portions.

2. A method as defined in claim 1 wherein at least one of said difference signal and said original image signal is corrected for density and/or contrast with respect to the density range and/or the contrast range of the other of said difference signal and said original image signal.

3. A method as defined in claim 1 or 2 wherein a signal obtained by arithmetic averagig of said digital image signals detected from said two or more stimulable phosphor sheets is used as said original image signal.

4. A method of improving image quality of an energy subtraction image obtained by energy subtraction processing which includes the steps of exposing two or more stimulable phosphor sheets to radiations having different levels of energy passing through the same object which includes bone and soft tissue to have radiation images of said object stored in said stimulable phosphor sheets, at least a part of image information being different between said radiation images, scanning the respective stimulable phosphor sheets by stimulating rays to sequentially release the radiation energy stored in said stimulable phosphor sheets as light emission, photoelectrically detecting and converting the amounts of the emitted light into digital image signals which are each indicative of an image of said bone and said soft tissue, and obtaining a first difference signal for forming an image wherein the image of said soft tissue is erased by carrying out a subtraction processing of said digital image signals between corresponding picture elements of said radiation images, wherein the improvement comprises the steps of: obtaining a second difference signal for forming an image wherein the image of said bone is erased by carrying out a subtraction processing of said digital image signals between corresponding picture elements of said radiation images, selecting picture elements where said tissue image would be present in said first difference signal, and reproducing a visible radiation image by using said selected picture elements in said first difference signal for picture elements at the portion where said image of the soft tissue having a thickness of a predetermined value or larger is present, and by using an original image signal, which corresponds to at least one of said digital image signals and is indicative of the image of said bone and said soft tissue, for picture elements at the other portions.

5. A method as defined in claim 4 wherein at least one of said difference signal and said original image signal is corrected for density and/or contrast with respect to the density range and/or the contrast range of the other of said difference signal and said original image signal.

6. A method as defined in claim 4 or 5 wherein a signal obtained by arithmetic averaging of said digital image signals detected from said two or more stimulable phosphor sheets is used as said original image signal.

7. An apparatus for improving image quality of an energy subtraction image which comprises:
(i) an image read-out means for scanning a stimulable phosphor sheet carrying out a radiation image stored therein by stimulating rays which cause the stimulable phosphor sheet to emit light in proportion to the stored radiation energy, and photoelectrically detecting and converting the emitted light into a digital image signal.
(ii) a subtraction operation means for obtaining a difference signal for forming an image wherein a bone image is erased and a difference signal for forming an image wherein a soft tissue image is erased by conducting a subtraction processing of digital image signals which are each indicative of said bone image and said soft tissue image between the corresponding picture elements of radiation images, said digital image signals being detected by said image read-out means from two or more stimulable phosphor sheets carrying said radiation images stored therein by exposure to radiations having different levels of energy passing through the same object which includes bone and soft tissue, at least a part of the image information on said object being different between said radiation images,
(iii) a discrimination means for discriminating the portion where said bone image is present on the basis of said difference signal for forming the image wherein the soft tissue image is erased, and generating a position signal representing the position of said portion, and
(iv) a signal selection means for receiving an original image signal, which corresponds to at least one of said digital image signals and is indicative of the image of said bone and said soft tissue, said difference signal for forming the image wherein the bone image is erased, and said position signal generated by said discrimination means, sending out said difference signal for forming the image wherein the bone image is erased as the image signal at the portion where the bone image and the soft tissue image overlap each other by referring to said position signal, and sending out said original image signal as the image signal at the other portions.

8. An apparatus for improving image quality of an energy subtraction image which comprises:
(i) an image read-out means for scanning a stimulable phosphor sheet carrying a radiation image stored therein by stimulating rays which cause the stimulable phosphor sheet to emit light in proportion to the stored radiation energy, and photoelectrically detecting and converting the emitted light into a digital image signal,
(ii) a subtraction operation means for obtaining a difference signal for forming an image wherein a bone image is erased and a difference signal for forming an image wherein a soft tissue image is erased by conducting a subtraction processing of digital image signals which are each indicative of said bone image and said soft tissue image between the corresponding picture elements of radiation images, said digital image signals being detected by said image read-out means from two or more stimulable phosphor sheets carrying said radiation images stored therein by exposure to radiations having different levels of energy passing through the same object which includes bone and soft tissue, at least a pair of the image information on said object being different between said radiation images,
(iii) a discrimination means for discriminating the portion where said image of the soft tissue having a thickness of a predetermined value or larger is present on the basis of said difference signal for forming the image wherein the bone image is erased, and generating a position signal representing the position of said portion, and
(iv) a signal selection means for receiving an original image signal, which corresponds to at least one of said digital image signals and is indicative of the image of said bone and said soft tissue, said difference signal for forming the image wherein the soft tissue image is erased, and said position signal generated by said discrimination means, sending out said difference signal for forming the image wherein the soft tissue image is erased as the image signal at the portion where the image of the soft tissue having a thickness of the predetermined value or larger is present by referring to said position signal, and sending out said original image signal as the image signal at the other portions.

9. An apparatus as defined in claim 7 or 8, wherein a signal obtained by arithmetic averaging of said digital image signals detected from said two or more stimulable phosphor sheets is used as said original image signal.

* * * * *